US012378780B2

(12) United States Patent
Lacasse-Veilleux et al.

(10) Patent No.: US 12,378,780 B2
(45) Date of Patent: Aug. 5, 2025

(54) TOOLS FOR APPLICATION OF BINDING AGENTS AND FILLER

(71) Applicant: Maax Bath Inc., Lachine (CA)

(72) Inventors: Christine Lacasse-Veilleux, Saint-Isidore-de-Laprairie (CA); Thomas Debaugh, Bel Air, MD (US)

( * ) Notice: Subject to any disclaimer, the term of this patent is extended or adjusted under 35 U.S.C. 154(b) by 552 days.

(21) Appl. No.: 17/724,396

(22) Filed: Apr. 19, 2022

(65) Prior Publication Data

US 2022/0364374 A1 Nov. 17, 2022

Related U.S. Application Data

(60) Provisional application No. 63/176,433, filed on Apr. 19, 2021.

(51) Int. Cl.

| | |
|---|---|
| ***E04F 21/16*** | (2006.01) |
| ***B05C 3/00*** | (2006.01) |
| ***B28B 19/00*** | (2006.01) |
| ***E04F 21/00*** | (2006.01) |

(52) U.S. Cl.

CPC .............. *E04F 21/162* (2013.01); *B05C 3/00* (2013.01); *B28B 19/00* (2013.01); *E04F 21/0084* (2013.01)

(58) Field of Classification Search

USPC ........ 118/400, 413, 102; 404/105, 107, 118; 52/742.16; 15/235.8

See application file for complete search history.

(56) References Cited

U.S. PATENT DOCUMENTS

| | | | | | |
|---|---|---|---|---|---|
| 3,611,470 | A * | 10/1971 | Gaston | E04F 21/06 | 15/245.1 |
| 4,766,634 | A | 8/1988 | DeVitis | | |
| 5,607,256 | A * | 3/1997 | McCleary | E04F 21/20 | 15/236.08 |

(Continued)

FOREIGN PATENT DOCUMENTS

| | | | |
|---|---|---|---|
| CN | 206128566 | U | 4/2017 |
| DE | 202005014468 | U1 | 2/2006 |

(Continued)

OTHER PUBLICATIONS

Vernuos, Vernuos Caulking Tool Kit, amazon.com, (Jun. 8, 2019), https://www.amazon.com/VERNUOS-Caulking-Silicone-Finishing-Replaceable/dp/B07QQ4ZFKK (last visited on Nov. 2, 2022).

(Continued)

*Primary Examiner* — Yewebdar T Tadesse

(74) *Attorney, Agent, or Firm* — Bradley Arant Boult Cummings LLP; Phillip E. Walker; Alex H. Huffstutter

(57) ABSTRACT

A tool for applying a binding agent and/or a filler is provided. The tool enables convenient and accurate application of the binding agent and/or the filler, such as adhesive or mortar for wall panels and grout between wall panels. The tool comprises a body including a front surface, a rear surface, and a plurality of edges circumferentially extending around the body, each of the plurality of edges defining a junction of the front surface and the rear surface. One of the plurality of edges comprises a plurality of teeth extending away from the body. The teeth may comprise a flat face. One of the plurality of edges may comprise a protrusion. One or more rounded corners may be circumferentially disposed around the body between two proximal edges.

19 Claims, 7 Drawing Sheets

(56) References Cited

U.S. PATENT DOCUMENTS

| | | | | |
|---|---|---|---|---|
| 6,178,586 | B1 | 1/2001 | Jafarmadar | |
| 2006/0162111 | A1 | 7/2006 | Miller | |
| 2007/0266937 | A1 * | 11/2007 | Fascianella | E04F 21/20 118/400 |

FOREIGN PATENT DOCUMENTS

| | | | | |
|---|---|---|---|---|
| JP | 2000-087549 | A | 3/2000 | |
| WO | WO-2013001277 | A2 * | 1/2013 | E04F 21/16 |

OTHER PUBLICATIONS

Charlie DIYte, How to Apply Silicone Sealant-the Easy Way!, youtube.com, (Jun. 12, 2016), https://www.youtube.com/watch?v =—RimUOGISU&ab_channel=CharlieDIYte (last visited on Nov. 2, 2022).

No Nonsense Smoothing Tools Concave Joints, bigamart.com; https://bigamart.com/product/nononsense-smoothing- tools-concave-joints/? gclid=Cj0KCQjwnqH7BRDdARIsACTSAdtEmS2r4VKehOh2bKIEFJxF52GTSiJIEiTHNVxPmkxfR6RyMcBiaVEaAn5qEALw_wcB (last visited on Nov. 2, 2022).

Claddtech, The Secret Tool for Silicone Sealant Application, youtube.com, (Jan. 24, 2019), https://www.youtube.com/watch?v=CvZV50HXz0A&ab_channel=Claddtech (last visited on Nov. 2, 2022).

Diconna, New 3 Pcs Silicone Caulk Nozzle Applicator Caulking Tools, Caulking Finisher Nozzle, Sealant Finishing Tool Grout Scrape 6.5 R 10R 13R; Walmart.com; https://www.walmart.ca/en/ip/New-3-Pcs-Silicone-Caulk-Nozzle-Applicator-Caulking-Tools-Caulking-Finisher-Nozzle-Sealant-Finishing-Tool-Grout-Scrape-6-5-R-10R-13R/2UTFU2DR121W (last visited on Nov. 2, 2022).

Office Action for corresponding CA Application No. 3,155,562, dated Jul. 13, 2023, in 6 pgs.

Office Action for corresponding CA Application No. 3,155,562, dated Apr. 26, 2024, in 9 pgs.

* cited by examiner

TOOLS FOR APPLICATION OF BINDING AGENTS AND FILLER

TECHNICAL FIELD

The present disclosure relates to an apparatus for use in installation of construction materials. More specifically, the disclosure is directed towards a tool for the application of adhesive and grout, such as in shower environments of bathrooms.

BACKGROUND OF THE DISCLOSURE

During construction or renovation, many materials require a binding agent to be applied for installation of that material on a substrate. By way of example, floor or wall tiles and panels typically require a binding agent, such as tile mortar or construction adhesive, to be applied between them and the substrate (e.g., drywall of a wall or subfloor of a floor) with which the tiles or panels are to be installed. Proper application of the binding agent is critical to obtaining proper attachment of the material and the substrate. Indeed, an insufficient quantity, an excessive quantity, or an uneven application of the binding agent can cause, or risk causing, a weak attachment between the material and the substrate, which may cause the material to become unattached from the substrate. Such unattachment may result in additional construction or renovation costs and even in potential bodily harm (such as a risk of injury due to a falling tile).

Moreover, adjoining materials typically require that the space between them be filled, such as with binding agents or filler (e.g., grout, silicone, etc.). Indeed, adjacent tiles require a space disposed therebetween with grout or silicone typically installed in the space. Similarly, wall panels can have a simulated tile pattern, whereby the wall panel mimics a tiled wall by having tile portions (typically smooth) and relief portions disposed between the tile that simulate grout lines (often with a texture that is less smooth than the tile to accurately simulate a tiled wall). Yet, due to size and because many projects typically require multiple wall panels (such as, three walls that form a shower enclosure area), most projects will require use of more than one panel. Therefore, whether in the case of wall panels or individual tiles, a filler (such as grout) must be installed between adjacent tiles or panels. The filler creates a seamless appearance and prevents dirt, water, and debris from going behind the material. Consequently, the filler lessens the risk of deleterious effects, such as a weak attachment of the material to the substrate or the growth of mold behind the material.

However, the filler must be applied evenly and in proper quantities. Indeed, an insufficient quantity filler does not create a seamless appearance and may allow for dirt, water, and debris to get behind the material. Meanwhile, an excessive quantity of filler likewise does not create a seamless appearance and would be difficult to clean and keep clean because of protruding filler lines. Moreover, filler should not be applied to, and/or remain on, the ornamental surface of the material (i.e., the surface of the installed material that faces a user). Therefore, a slightly recessed, smooth filler line between adjacent materials is typically desired, such that the ornamental surface of the material is free from visible filler.

Accordingly, there remains a need in the art for improved tools for applying binding agents and fillers during construction and renovation projects, such as during the installation of bath shower wall panels or tiles.

SUMMARY

The problems expounded above, as well as others, are addressed by the following inventions, although it is to be understood that not every embodiment of the inventions described herein will address each of the problems described above. In some embodiments, the present disclosure provides apparatuses, such as tools, for applying binding agents and fillers, during installation of materials, such as wall panels or tiles. The apparatuses enable binding agents to be evenly applied and applied in a proper quantity such that the material is securely attached to a substrate (such as on a drywall wall). The apparatuses enable a filler or binding material, such as grout, silicone, and/or caulk, to be applied in proper quantity and enable excess filler or binding material to be removed. The apparatuses may enable the filler to be installed with a desired profile, such as rounded. The apparatuses of the disclosure may enable excessive binding agents or filler to be removed from the material. The apparatuses of the disclosure may combine any of the foregoing advantages into a single tool to reduce the number of tools needed for installation of the materials.

In a first aspect, a tool is disclosed. The tool includes a body. The body may be integrally formed. The body includes a front surface, a rear surface, and a plurality of edges circumferentially extending around the body, each of the plurality of edges defining a junction of the front surface and the rear surface. The plurality of edges includes a first edge comprising a plurality of teeth extending away from the body. Each of the plurality of teeth comprises a flat face disposed on each tooth oppositely from the body. The plurality of teeth may taper inwardly as the teeth extend from the body to the flat face. The flat face may be parallel to the edge that comprises the plurality of teeth.

The plurality of edges may include a horizontal second edge. A rounded corner may be disposed between the horizontal second edge and the one of the plurality of edges, defining an angle of less than 90 degrees. The angle may be between 85 degrees and 89.5 degrees. One of the plurality of edges may comprise a protrusion extending away from the body. The protrusion may be disposed centrally laterally along the edge that comprises the protrusion. The plurality of edges may taper inwardly as they extend away from the body.

In a second aspect, further embodiments of a tool are provided. The tool includes a body including a front surface, a rear surface, and a plurality of edges circumferentially extending around the body. The plurality of edges each defines a junction of the front surface and the rear surface. The plurality of edges includes a first edge comprising a plurality of teeth extending away from the body. The plurality of edges includes a horizontal second edge. The horizontal second edge includes a protrusion, which can be positioned centrally laterally along the second edge. A rounded corner is disposed between the horizontal second edge and one of the plurality of edges, defining an angle of less than 90 degrees. The angle may be between 85 degrees and 89.5 degrees. One of the plurality of edges may include a protrusion extending away from the body. The protrusion may be disposed on a third edge. One or more of the plurality of edges may taper inwardly as the edges extend away from the body.

In a third aspect, yet further embodiments of a tool are provided. The tool includes a body. The body may be integrally formed. The body includes a front surface, a rear surface, and a plurality of edges circumferentially extending around the body, each of the plurality of edges defining a junction of the front surface and the rear surface. The body may comprise one or more corners having a radius of 2-8 mm. The body may comprise a first corner having a first radius and a second corner having a second radius, wherein the first radius is different from the second radius.

The plurality of edges includes a first edge comprising a plurality of teeth extending away from the body. The plurality of edges includes a second edge having a protrusion extending away from the body. The protrusion may be positioned centrally laterally along the second edge. The protrusion may be dimensioned to be received in a grout line between adjacent tiles, simulated tiles, or wall panels. The one or more of the plurality of edges may taper inwardly as the one or more plurality of edges extend away from the body.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

Further features and advantages can be ascertained from the following detailed description that is provided in connection with the drawings described below.

DETAILED DESCRIPTION

Figure 1:
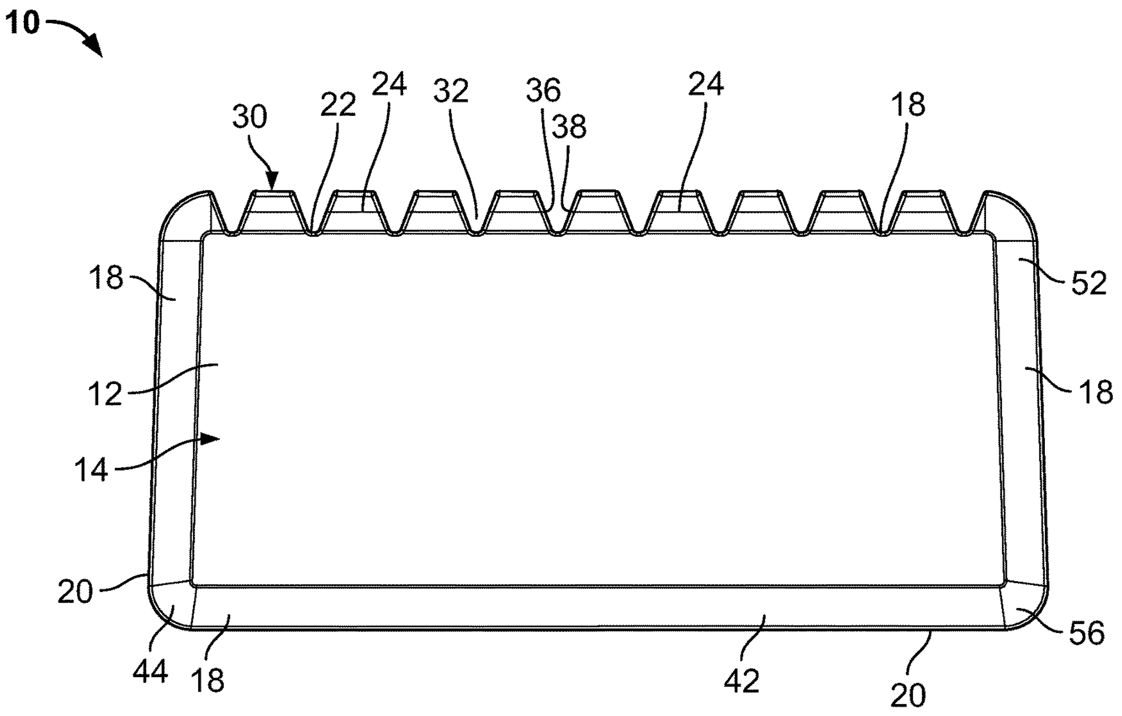
FIG. 1 is a front elevation view of a tool in accordance with an embodiment of the present disclosure.
Figure 2:
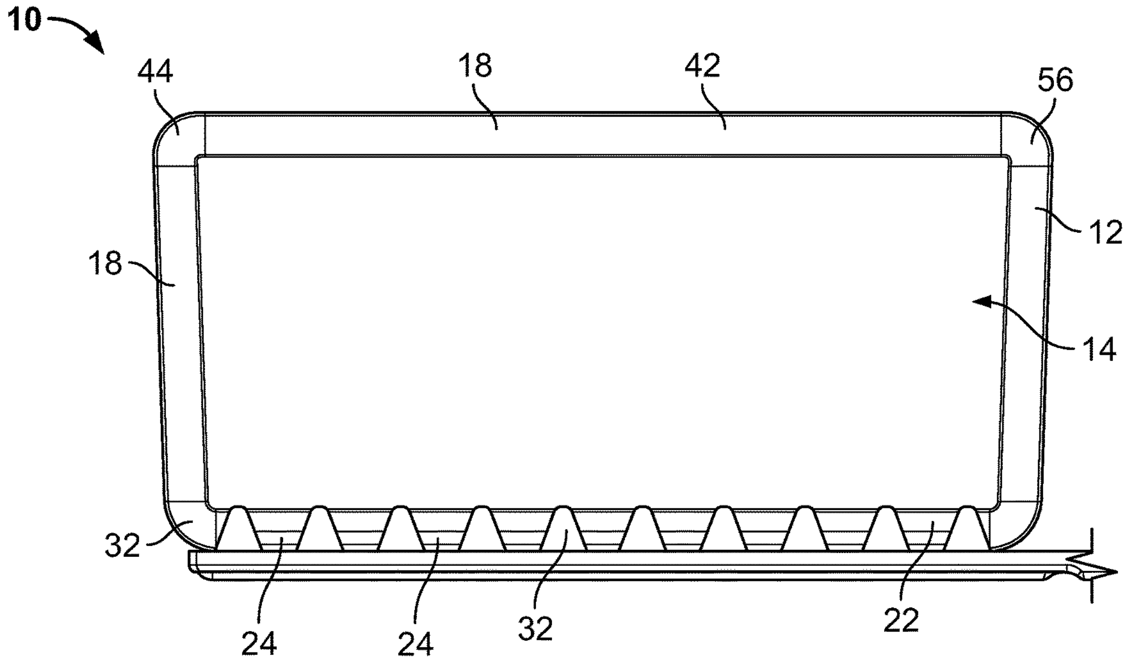
FIG. 2 is another front elevation view of the tool of FIG. 1.
Figure 3:
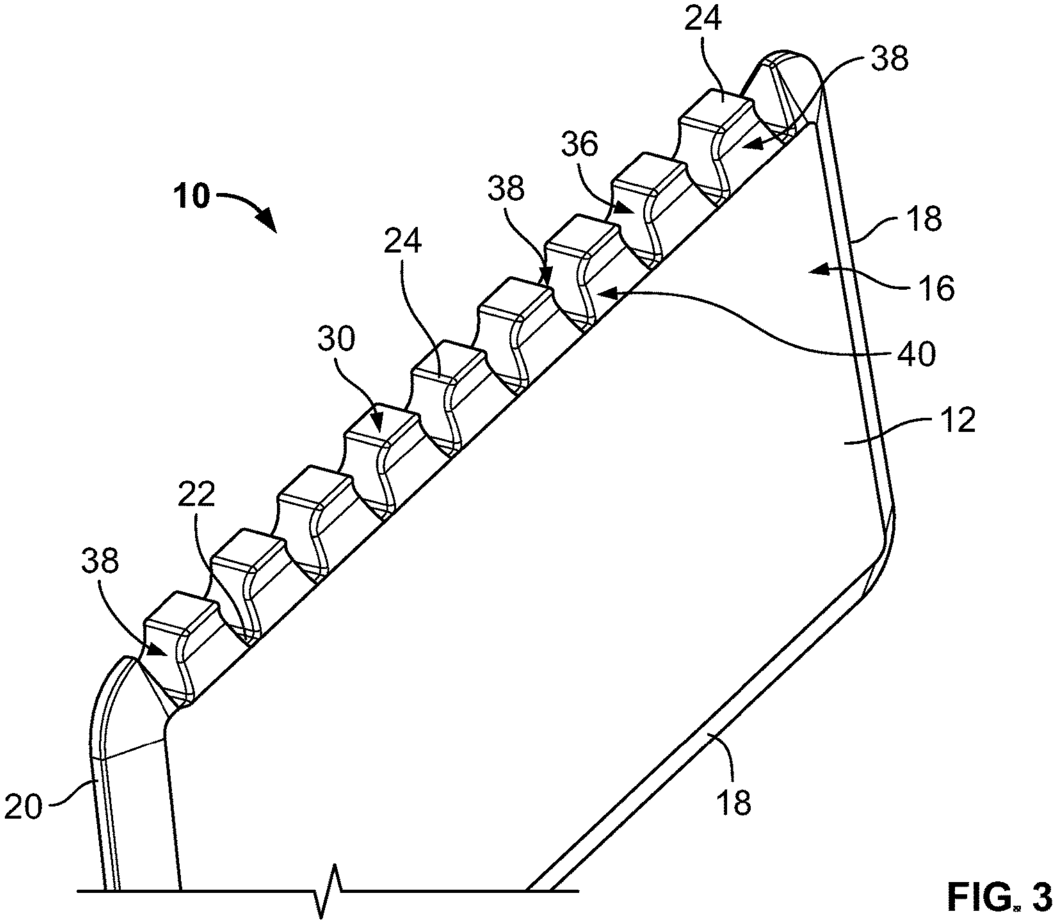
FIG. 3 is a perspective view of the tool of FIG. 1.

Reference now will be made in detail to the embodiments of the present disclosure. It will be apparent to those of ordinary skill in the art that various modifications and variations can be made to the teachings of the present disclosure without departing from the scope of the disclosure. For instance, features illustrated or described as part of one embodiment can be used with another embodiment to yield a further embodiment.

Thus, it is intended that the present disclosure covers such modifications and variations that come within the scope of the appended claims and their equivalents. Other objects, features, and aspects of the present disclosure are disclosed in or are apparent from the following description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the tool when in the orientation shown in the drawings. The skilled artisan will recognize that the tool can assume different orientations when in use.

Referring to FIGS. 1-9, a tool 10 comprises a body 12. The body 12 may be integrally formed. The body 12 may be constructed of any suitable material(s), such as a metal, an alloy, a polymer, or silicone. The body 12 may be rigid.

The body 12 includes a front surface 14 and a rear surface 16. The front surface 14 and the rear surface 16 may be disposed on the body 12 such that they face opposite directions. The front surface 14 and the rear surface 16 may be substantially planar or planar (i.e., flat) and in parallel planes to one another. The body 12 may include a plurality of edges 18 circumferentially extending around the body 12. The plurality of edges 18 may each define a junction 20 between the front surface 14 and the rear surface 16. In this way, the junction 20 defines the portion of the body 12 where the front surface 14 joins the rear surface 16. The one or more of the plurality of edges 18 may taper inwardly (i.e., inwardly from the front and rear surfaces 14, 16) as the edges extend away from the body 12.

Figure 5A:
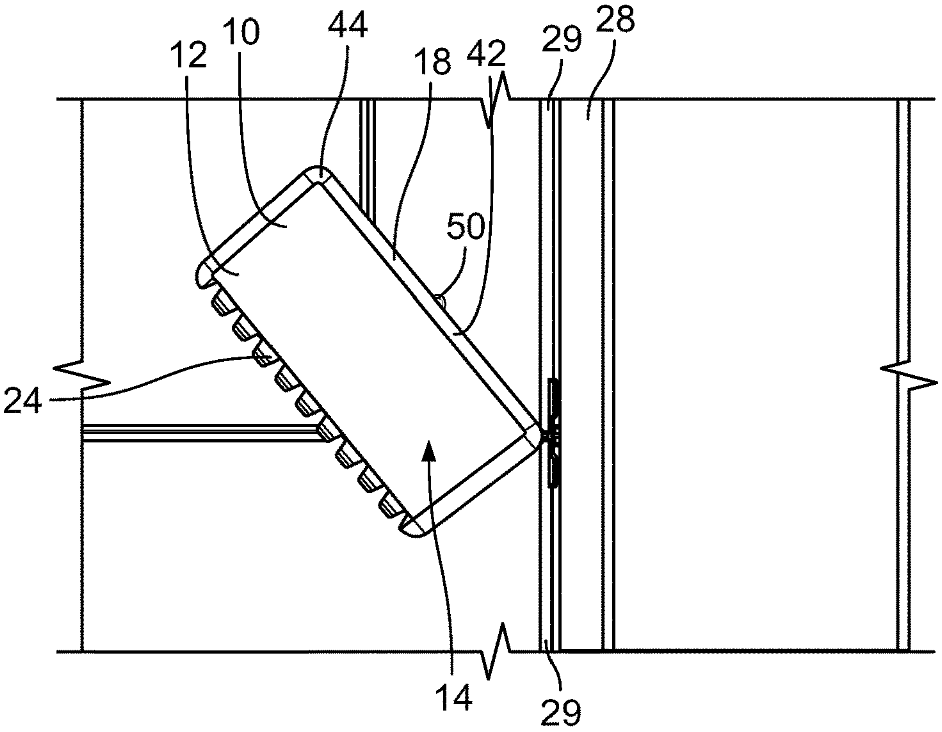
FIG. 5A is a front view of the tool of FIG. 1 with corner joint in use with a grout line.
Figure 5B:
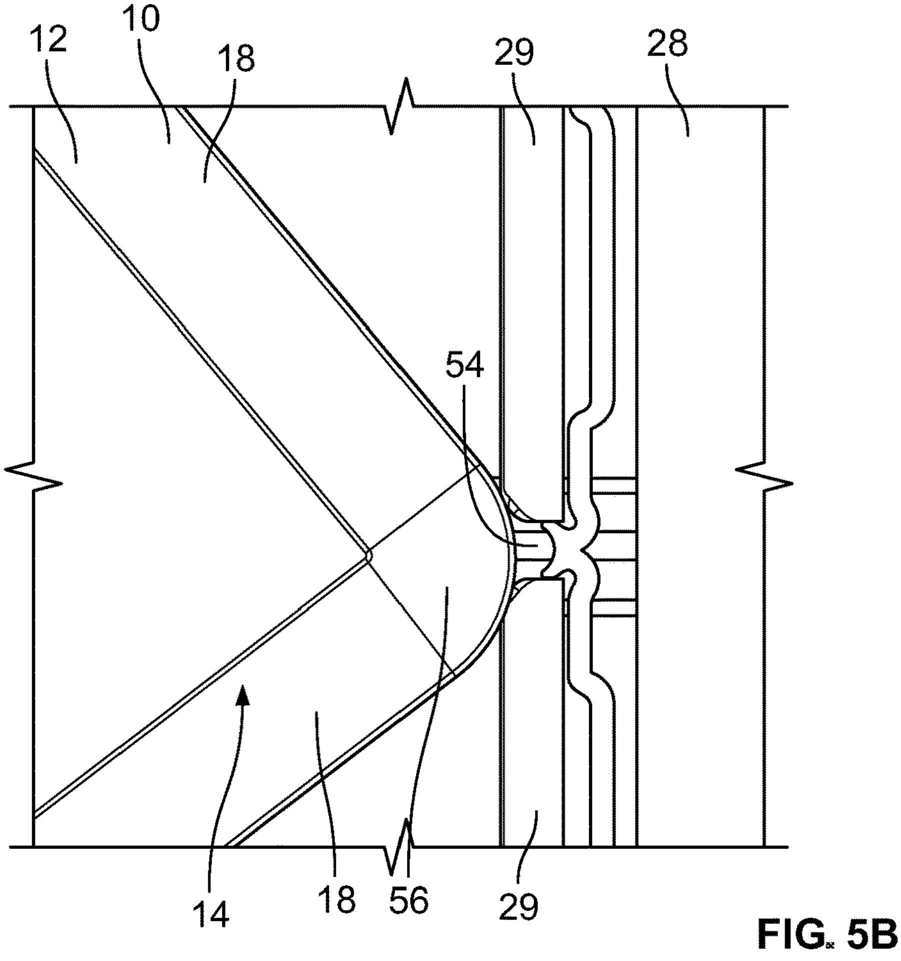
FIG. 5B is a close-up view of the front view of FIG. 5A.

The plurality of edges 18 may include a first edge 22 comprising a plurality of teeth 24 extending away from the body 12. The plurality of teeth 24 is useful for applying a binding agent 26 to a surface 28. The binding agent 26 may be any suitable binding agent 26 for adhering a material 29, such as a tile, wall panel, or floor panel, to the surface 28, as shown in FIGS. 5A and 5B. Exemplary binding agents 26 include adhesive, concrete, cement, thinset mortar, polymer-modified mortars, dry-set (unmodified) mortars, glue, and the like. The surface 28 may be any suitable surface, such as a concrete surface, a cement board surface, a plywood surface, a drywall surface, a hardwood surface, a particle-board surface, etc.

Figure 4A:
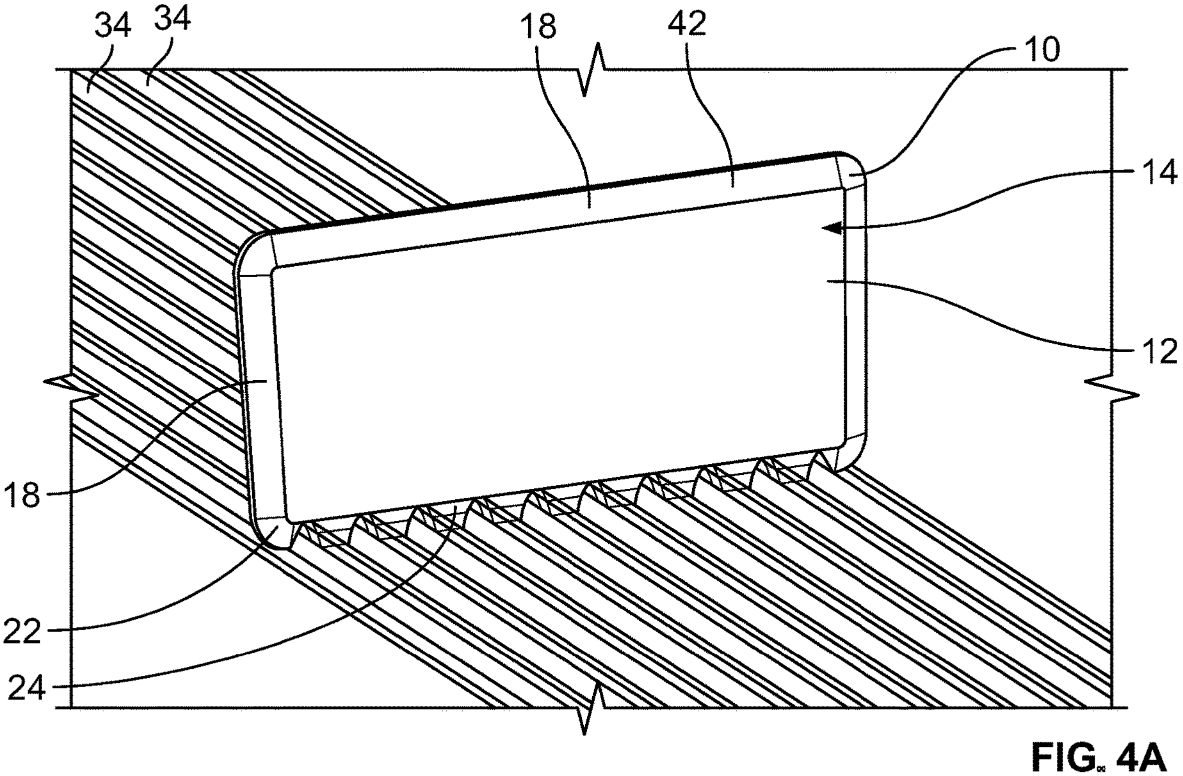
FIG. 4A illustrates the tool of FIG. 1 being used to apply a binding agent.
Figure 4B:
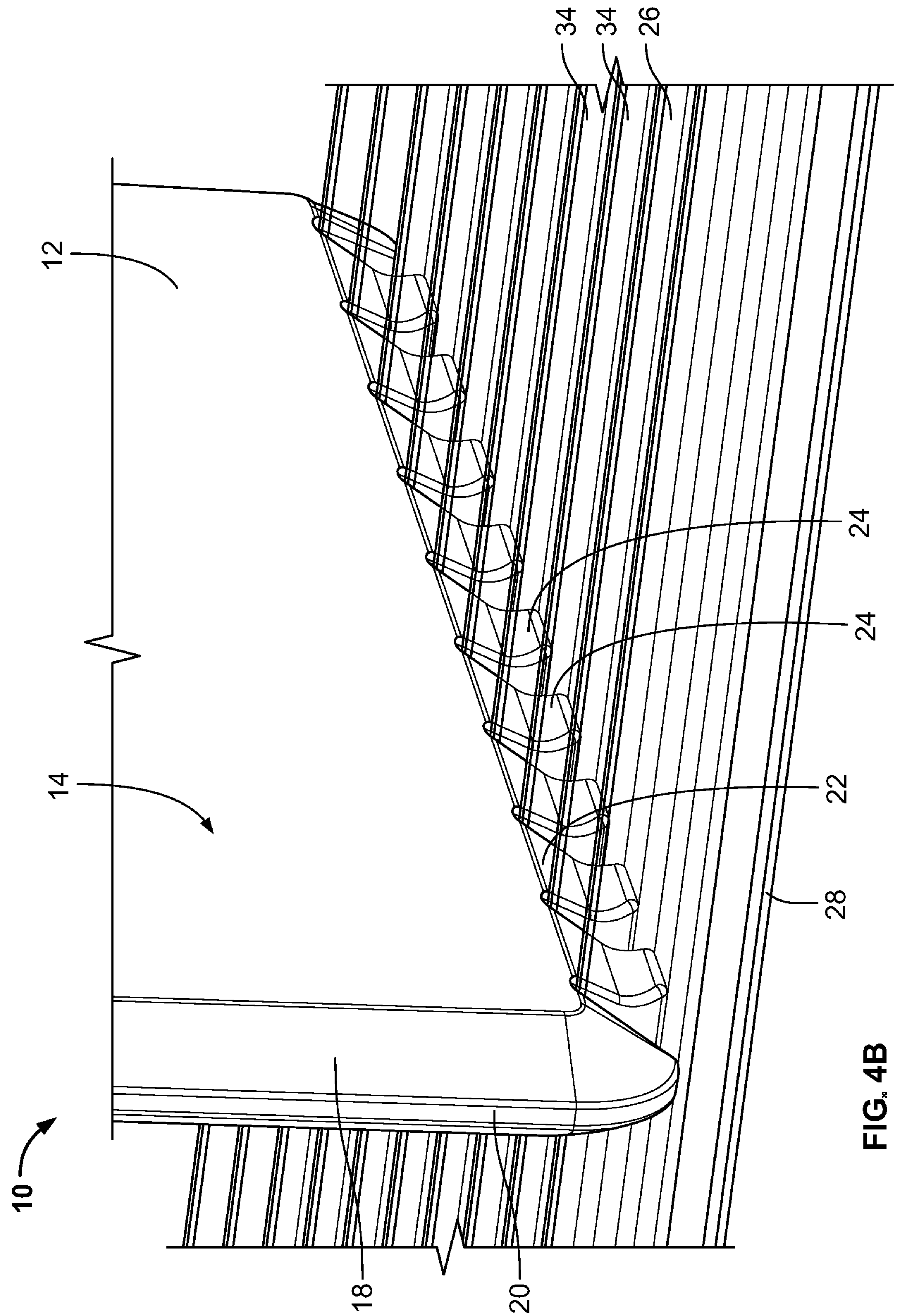
FIG. 4B illustrates a close-up, partial cutaway of the tool of FIG. 1 being used to apply a binding agent.

The plurality of teeth 24 may comprise a flat face 30 disposed on each tooth 24 oppositely from the body 12. The flat faces 30 may be in a plane that is parallel to a plane of the first edge 22 (i.e., the flat faces 30 and the first edge 22 may be parallel to one another). A recess 32 may be formed between each tooth 24. The recess 32 may have any suitable profile, such as a V-shaped profile (as shown in, for example, FIG. 5A), a modified V-shape (as shown in, for example, FIG. 1), or a U-shaped profile (not shown). When the binding agent 26 is applied to the surface 28, such as with the tool 10, the first edge 22 and the plurality of teeth 24 may be used to spread and distribute the binding agent 26. Specifically, as illustrated in FIGS. 4A and 4B, the teeth 24 may be drawn along the surface 28 and/or the binding agent 26 disposed on the surface 28 such that the teeth 24 displace the binding agent 26 and guide the binding agent 26 through the recesses 32. In this way, the applied or distributed binding agent 26 is formed in parallel grooves 34 along a line, with each groove 34 or line having a profile that is cooperatively shaped to the profile of the tooth 24 that formed the groove 34.

Advantageously, the flat faces 30 disposed on the teeth 24 enable the user to more easily keep the tool 10 orthogonal (i.e., the planes of the front and rear surfaces 14, 16) to the surface 28 while the plurality of teeth 24 are being used to spread or apply the binding agent 26. In this manner, the flat faces 30 allow for a more consistent application of the binding agent 26, as tilting of the tool 10 during this process leads to uneven application of the binding agent 26. For example, when the tool 10 is tilted out of an orthogonal orientation with the surface 28, less binding agent 28 is applied.

The plurality of teeth 24 may inwardly taper as the teeth 24 extend away from the body 12. Specifically, the plurality of teeth 24 comprises inwardly sloping sides 36 as the teeth 24 extend from the body 12 to the flat face 30 to form the recesses 32. The plurality of teeth 24 may comprise a front tooth surface 38 and a rear tooth surface 40, each of the front and rear tooth surfaces 38, 40 being generally concave in profile. In other words, the front and rear tooth surfaces 38, 40 may taper inwardly between the flat face 30 and the first edge 22. Beneficially, this concave profile of the front and rear tooth surfaces 38, 40 (depending on the orientation of the tool 10 when in-use) guides the binding agent 26 to the recesses 32 to cause an even application of the binding agent 26.

Figure 8:
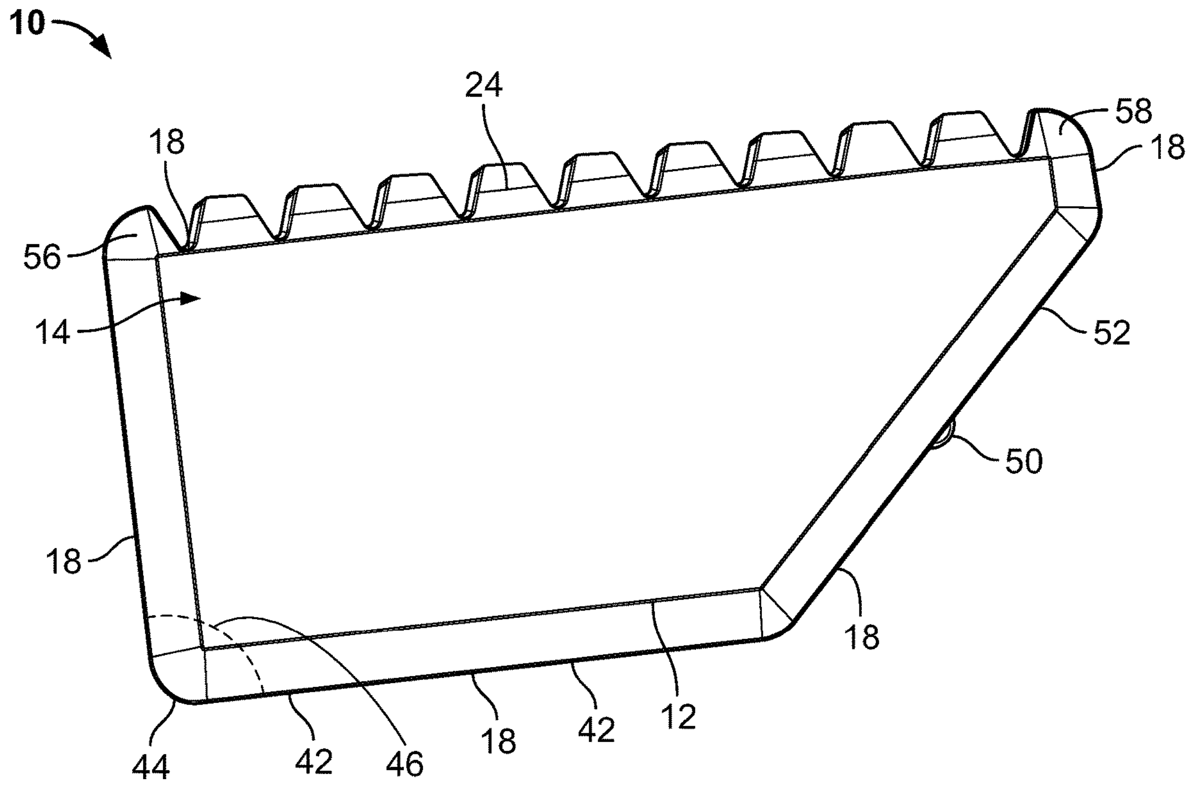
FIG. 8 is a front elevation view of a tool in accordance with yet another embodiment of the present disclosure.

The plurality of edges 18 may comprise a second edge 42. The second edge 42 may be horizontal. A rounded first corner 44 may be circumferentially disposed on the tool 10 between the second edge 42 and the one of the plurality of edges 18. The rounded first corner 44 may define a corner angle 46 of less than 90 degrees, as shown in FIG. 8. The corner angle 46 may be between 85 degrees and 89.5 degrees. The corner angle 46 may be 89 degrees. Beneficially, by having a corner angle 46 of less than 90 degrees, the tool 10 more easily fits with, and can be more versatilely used in, corners 48 of materials 29, such as the corners formed between panels of an enclosure.

Figure 6:
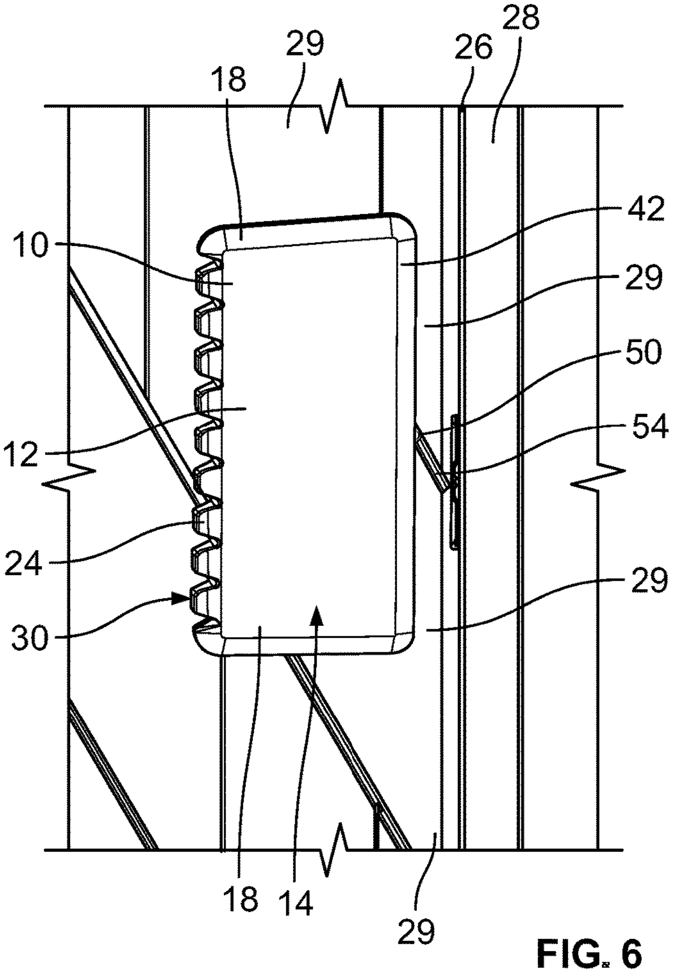
FIG. 6 is a front view of a tool with a protrusion in use with a grout line according to an embodiment of the present disclosure.

One of the plurality of edges 18 may comprise a protrusion 50. The protrusion 50 may be disposed on, for example, the second edge 42 or a third edge 52. The protrusion 50 may be located in any lateral position along the edge 18 on which it is disposed. In some embodiments of the tool 10, the protrusion 50 is positioned centrally laterally along the edge 18. The protrusion 50 may be dimensioned to be received in a filler line 54 (such as a grout line) between adjacent materials 29, such as tiles, simulated tiles, or wall panels, as shown in FIG. 6. The protrusion 50 may have a rounded profile. Advantageously, the protrusion 50 enables filler (e.g., grout, silicone, caulk) to be applied between adjacent materials 29 in a plane, as the protrusion 50 enables a proper amount, and profile, of filler to be applied in adjacent materials 29.

Figure 7:
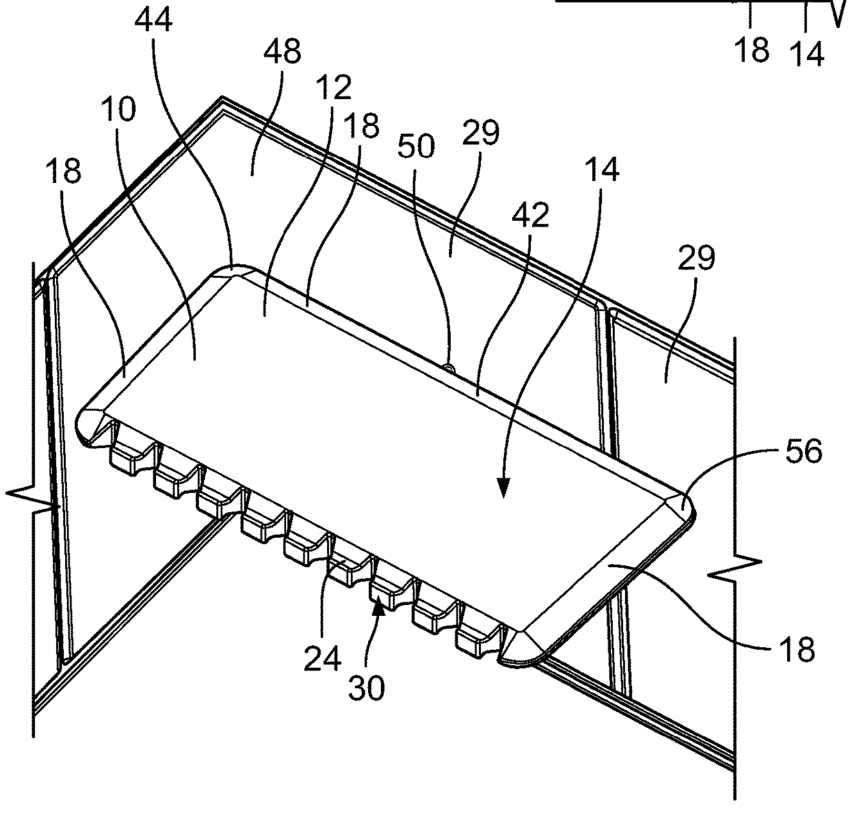
FIG. 7 is a front-perspective view of the tool of FIG. 6 in use with a corner.

The body 12 may comprise a second rounded corner 56 and a third rounded corner 58. The rounded corners 44, 56, 58 each may have a radius of from 2 mm to 8 mm. In some embodiments, one of the rounded corners 44, 56, 58 has a first corner radius and another one of the rounded corners 44, 56, 58 has a second corner radius that is different than the first corner radius. By way of example, the first corner radius may be 5 mm, and the second corner radius may be 6 mm. Advantageously, the different corner radii enable the tool 10 to be more widely used between adjacent materials 29 or apply more or less filler or binding agent 26 in the corner 48 therebetween, as shown in FIG. 7.

The tool 10, via the edges 18 (e.g., horizontal second edge 42), may be used for scraping the binding agent 26 and/or filler from the surface of the material 29. The tool 10 may comprise or exclude any one or more of the foregoing features.

Figure 9:
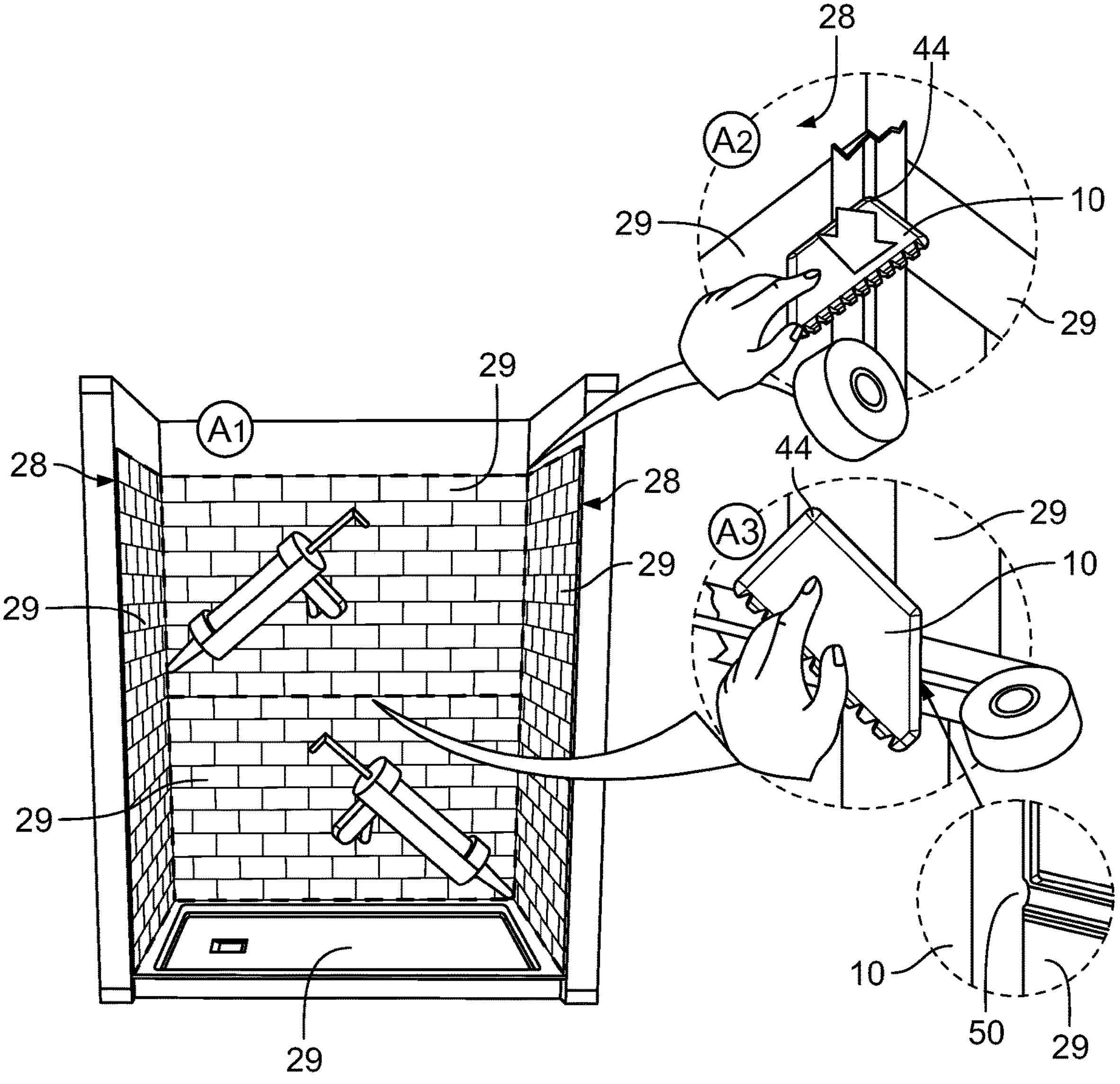
FIG. 9 illustrates the tool shown in FIG. 8 in use with panels of an enclosure.

Referring to FIG. 9, a bead of the filler, such as silicone, may be applied along corner joints of panels. An exemplary method of applying the filler along joints is to adhere painters tape or masking tape to either side of the joints of the panels to avoid excessive filler on the panels and then apply a generous amount of the filler along the joint, such as with a caulk gun. Then, starting at the top of the joint, the tool 10 may be downwardly moved along the joint while maintaining an orientation that is generally orthogonal to the panels to remove excess filler from the corner joint, as depicted in enlarged $A_2$. Specifically, one of the rounded corners 44, 56, 58 may be used to remove excess filler from the corner joint. The user may select the rounded corner 44, 56, 58 having a geometry (such as radius and angle) that has a profile that has the best cooperative or complementary fit with the corner joint. The ability to choose which rounded corner 44, 56, 58 to use is highly advantageous, as often installed panels having corner joints that differ in profile due to imperfections in structure walls, structure settling, or structure construction that has imperfectly square walls.

A bead of filler may be applied along adjoining panels in the same (including substantially the same) plane on a wall of a structure. Then, starting at one side of the joint, the tool 10 may be moved (as shown, laterally) along the joint while maintaining an orientation that is generally orthogonal to the panels to remove excess filler from the joint, as depicted in enlarged $A_3$. The protrusion 50, which may have a profile that is complementary to the joint, modulates the amount and shape of filler in the joint for evenness in amount and/or shape along the joint.

Although embodiments of the disclosure have been described using specific terms, devices, and methods, such description is for illustrative purposes only. The words are words of description rather than of limitation. It is to be understood that changes and variations may be made by those of ordinary skill in the art without departing from the spirit or scope of the present disclosure, which is set forth in the following claims. It is further noted that any range provided herein provides support and a basis for any subset within that range. Further embodiments of the disclosure contain combinations, or exclusions, of different embodiments described herein.

Thus, although there have been described embodiments of the present invention of a new and useful tool, it is not intended that such references be construed as limitations upon the scope of this invention except as set forth in the following claims.

What is claimed is:

1. A tool, comprising:
a body including
  a front surface,
  a rear surface, and
  a plurality of edges circumferentially extending around the body, each of the plurality of edges defining a junction of the front surface and the rear surface,
wherein the plurality of edges includes a first edge comprising a plurality of teeth extending away from the body, the plurality of teeth comprising a flat face disposed on each tooth oppositely from the body, the plurality of teeth comprising a front tooth surface extending from the front surface between the first edge and the flat face, and a rear tooth surface extending from the rear surface between the first edge and the flat face, each of the front tooth surface and the rear tooth surface being concave.

2. The tool of claim 1, wherein the plurality of edges includes a horizontal second edge, and wherein the body includes a rounded corner disposed between the horizontal second edge and one of the plurality of edges, the horizontal second edge and the one of the plurality of edges defining an angle of less than 90 degrees.

3. The tool of claim 1, wherein the angle is between 85 and 89.5 degrees.

4. The tool of claim 1, wherein the plurality of teeth taper inwardly as the teeth extend from the body to the flat face.

5. The tool of claim 1, wherein one of the plurality of edges comprises a protrusion extending away from the body.

6. The tool of claim 5, wherein the protrusion is positioned centrally laterally along the one of the plurality of edges comprising the protrusion.

7. The tool of claim 1, wherein the body is integrally formed.

8. The tool of claim 1, wherein one or more of the plurality of edges taper inwardly as the one or more plurality of edges extend away from the body.

9. The tool of claim 1, wherein the flat face is parallel to the first edge comprising the plurality of teeth.

10. A tool, comprising:
a body including
a front surface,
a rear surface, and
a plurality of edges circumferentially extending around the body, each of the plurality of edges defining a junction of the front surface and the rear surface,
wherein the plurality of edges includes a first edge comprising a plurality of teeth extending away from the body, and wherein the plurality of edges includes a horizontal second edge, and wherein the body includes a rounded corner disposed between the horizontal second edge and a third edge of the plurality of edges, the rounded corner tapering inwardly from both the front surface and the rear surface as the rounded corner extends away from the body, the horizontal second edge and the third edge of the plurality of edges defining an angle of less than 90 degrees.

11. The tool of claim 10, wherein the angle is between 85 and 89.5 degrees.

12. The tool of claim 10, wherein one of the plurality of edges comprises a protrusion extending away from the body.

13. The tool of claim 12, wherein the third edge comprises the protrusion.

14. The tool of claim 10, wherein one or more of the plurality of edges taper inwardly as the one or more plurality of edges extend away from the body.

15. A tool, comprising:
a body including
a front surface,
a rear surface, and
a plurality of edges circumferentially extending around the body, each of the plurality of edges defining a junction of the front surface and the rear surface, the plurality of edges tapering inwardly from both the front surface and the rear surface as the plurality of edges extend away from the body,
wherein the plurality of edges includes a first edge comprising a plurality of teeth extending away from the body, and wherein the plurality of edges includes a second edge having a singular rounded protrusion extending away from the body.

16. The tool of claim 15, wherein the singular rounded protrusion is positioned centrally laterally along the second edge.

17. The tool of claim 15, wherein the singular rounded protrusion is dimensioned to be received in a grout line between adjacent tiles, simulated tiles, or wall panels.

18. The tool of claim 15, wherein the body comprises one or more corners having a radius of 2-8 mm.

19. The tool of claim 15, wherein the body comprises a first corner having a first radius and a second corner having a second radius, wherein the first radius is different from the second radius.

* * * * *